United States Patent
Skärby et al.

(10) Patent No.: US 9,635,674 B2
(45) Date of Patent: Apr. 25, 2017

(54) RADIO BASE STATION AND A METHOD THEREIN FOR SCHEDULING UPLINK RESOURCES

(71) Applicant: Telefonaktiebolaget LM Ericsson (publ), Stockholm (SE)

(72) Inventors: Ulf Skärby, Lidingö (SE); Pär Ankel, Nödinge (SE); Henrik Egnell, Uppsala (SE); Maria Henriksson, Sköndal (SE); Billy Hogan, Sollentuna (SE); Anders Lamm, Mölndal (SE); Marc Mjögeman, Göteborg (SE); Gunilla Sjöström, Göteborg (SE); Torbjörn Wigren, Uppsala (SE); Zhang Zhang, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 68 days.

(21) Appl. No.: 14/649,774

(22) PCT Filed: Dec. 19, 2012

(86) PCT No.: PCT/SE2012/051432
§ 371 (c)(1),
(2) Date: Jun. 4, 2015

(87) PCT Pub. No.: WO2014/098664
PCT Pub. Date: Jun. 26, 2014

(65) Prior Publication Data
US 2015/0312916 A1 Oct. 29, 2015

(51) Int. Cl.
*H04W 72/08* (2009.01)
*H04W 28/02* (2009.01)
(Continued)

(52) U.S. Cl.
CPC .......... *H04W 72/08* (2013.01); *H04B 7/2618* (2013.01); *H04J 3/1694* (2013.01);
(Continued)

(58) Field of Classification Search
CPC ............. H04W 72/08; H04W 28/0236; H04W 72/1226; H04W 74/002
(Continued)

(56) References Cited

U.S. PATENT DOCUMENTS

| 2004/0029600 A1* | 2/2004 | Johnson ................ H04W 16/10 455/500 |
| 2004/0037258 A1* | 2/2004 | Scherzer ............... H04W 28/18 370/338 |

(Continued)

FOREIGN PATENT DOCUMENTS

| WO | 0072482 A1 | 11/2000 |
| WO | 2005060574 A2 | 7/2005 |
| WO | 2008058268 A1 | 5/2008 |

OTHER PUBLICATIONS

International Search Report and Written Opinion dated Dec. 19, 2013 for International Application Serial No. PCT/SE2012/051432, International Filing Date—Dec. 19, 2012 consisting of 11-pages.

*Primary Examiner* — Ronald B Abelson
(74) *Attorney, Agent, or Firm* — Christopher & Weisberg, P.A.

(57) ABSTRACT

A radio base station (RBS) and a method performed by an RBS for scheduling uplink resources to at least one UE are provided. The RBS comprises at least two receiving antenna branches and the RBS is operable in a radio communication network. The method comprises receiving transmissions from the at least one UE by means of the at least two receiving antenna branches; and determining at least one parameter relating to signal quality of the received transmissions. The method further comprises determining a
(Continued)

diversity gain of the at least two receiving antenna branches, wherein the diversity gain is determined based on the determined parameter(s); and scheduling uplink transmissions for the at least one UE based on the determined diversity gain.

21 Claims, 3 Drawing Sheets

(51) Int. Cl.

| | |
|---|---|
| *H04W 72/12* | (2009.01) |
| *H04W 74/00* | (2009.01) |
| *H04B 7/26* | (2006.01) |
| *H04J 3/16* | (2006.01) |
| *H04B 7/08* | (2006.01) |
| *H04B 17/318* | (2015.01) |
| *H04B 17/327* | (2015.01) |
| *H04B 17/336* | (2015.01) |
| *H04B 17/345* | (2015.01) |
| *H04W 88/02* | (2009.01) |
| *H04W 88/08* | (2009.01) |

(52) U.S. Cl.
CPC ... *H04W 28/0236* (2013.01); *H04W 72/1226* (2013.01); *H04W 74/002* (2013.01); *H04B 7/08* (2013.01); *H04B 17/318* (2015.01); *H04B 17/327* (2015.01); *H04B 17/336* (2015.01); *H04B 17/345* (2015.01); *H04W 88/02* (2013.01); *H04W 88/08* (2013.01)

(58) Field of Classification Search
USPC .......................................................... 370/330
See application file for complete search history.

(56) References Cited

U.S. PATENT DOCUMENTS

| | | | |
|---|---|---|---|
| 2004/0038658 A1* | 2/2004 | Gurelli | H04L 1/0002 455/226.3 |
| 2004/0102196 A1* | 5/2004 | Weckstrom | H04W 64/00 455/456.1 |
| 2004/0253955 A1 | 12/2004 | Love et al. | |
| 2006/0120395 A1 | 6/2006 | Xing et al. | |
| 2012/0201319 A1* | 8/2012 | Asplund | H04B 7/0413 375/267 |
| 2014/0161058 A1* | 6/2014 | Sundaresan | H04L 5/0058 370/329 |

* cited by examiner

RADIO BASE STATION AND A METHOD THEREIN FOR SCHEDULING UPLINK RESOURCES

TECHNICAL FIELD

The present disclosure relates to a Radio Base Station, RBS, and in particular to an RBS and a method therein for scheduling uplink resources to at least one User Equipment, UE.

BACKGROUND

An RBS may have two or more receiving antenna branches. These branches are normally balanced meaning that the energy coming from each individual antenna branch is approximately the same as the energy coming from the other antenna branches. This is valid for both the signal energy and the interference energy, thus the antenna branches of the RBS experience similar Signal to Interference and Noise Ratio, SINR.

It may happen that the antenna branches are not balanced, or are imbalanced, due to different feeder attenuation, dissimilar filters or unequal number of filters in the different antenna branches. Also a failure in an antenna branch or variations in the radio environment may cause the antenna branches to be imbalanced.

A change in balancing of the antenna branches may affect the ability of the RBS to receive uplink transmissions which may result in calls being dropped or inefficient use of uplink resources, deteriorated quality experienced by a user of a UE or mobile telephone.

SUMMARY

The object is to obviate at least some of the problems outlined above. In particular, it is an object to provide an RBS and a method performed by an RBS for scheduling uplink resources to at least one UE, wherein the RBS determines a diversity gain of multiple receiving antenna branches of the RBS and wherein the determined diversity gain is used when scheduling uplink transmissions for at least one UE. These objects and others may be obtained by providing an RBS and a method in an RBS according to the independent claims attached below.

According to an aspect a method performed by an RBS for scheduling uplink resources to at least one UE is provided. The RBS comprises at least two receiving antenna branches and the RBS is operable in a radio communication network. The method comprises receiving transmissions from the at least one UE by means of the at least two receiving antenna branches; and determining at least one parameter relating to signal quality of the received transmissions. The method further comprises determining a diversity gain of the at least two receiving antenna branches, wherein the diversity gain is determined based on the determined parameter(s); and scheduling uplink transmissions for the at least one UE based on the determined diversity gain.

According to an aspect, an RBS operable in a radio communication network, adapted for scheduling uplink resources to at least one UE is provided. The RBS comprises at least two receiving antenna branches. The RBS further comprises a receiving unit adapted for receiving transmissions from the at least one UE by means of the at least two receiving antenna branches. The RBS further comprises a determining unit adapted for determining at least one parameter relating to signal quality of the received transmissions, and adapted for determining a diversity gain of the at least two receiving antenna branches, wherein the diversity gain is determined based on the determined parameter(s). The RBS also comprises a scheduling unit adapted for scheduling uplink transmissions for the at least one UE based on the determined diversity gain.

The RBS and the method performed by the RBS may have several advantages. The scheduling of uplink transmissions for the at least one UE may still work properly even if the antenna branches are not balanced. The Enhanced UpLink, EUL, scheduling load estimation may be more accurate when the antenna branches are not balanced. Further, uplink resources may be more efficiently used without impacting Guaranteed Bit Rate (GBR) services. Yet an advantage may be that the RBS user need not worry about setting the diversity gain as it will be set automatically by the RBS.

BRIEF DESCRIPTION OF DRAWINGS

Embodiments will now be described in more detail in relation to the accompanying drawings, in which.

DETAILED DESCRIPTION

Briefly described, exemplifying embodiments of an RBS and a method performed by the RBS for scheduling uplink resources to at least one UE are provided. The RBS comprises at least two receiving antenna branches and the RBS is operable in any cellular or wireless communication network employing multiple diversity at the RBS.

Figure 1:
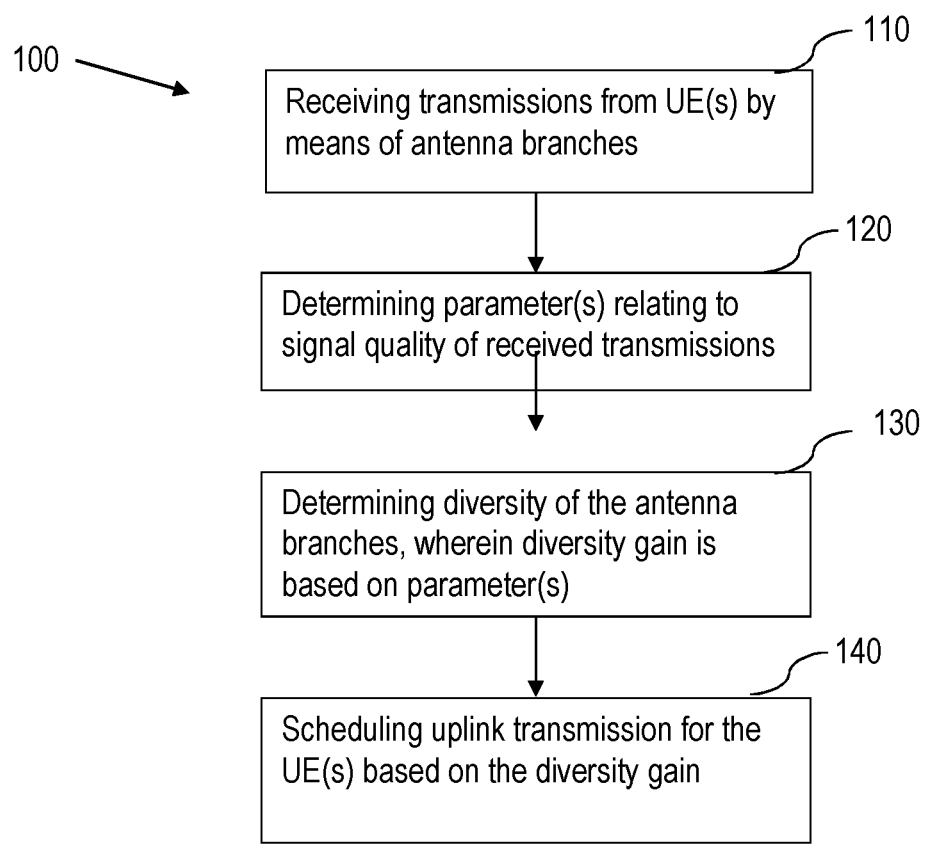
FIG. 1 is a flowchart of a method performed by an RBS for scheduling uplink resources to at least one UE according to an exemplifying embodiment.

An exemplifying embodiment of such a method performed by the RBS will now be described with reference to FIG. 1. FIG. 1 is a flowchart of a method 100 performed by an RBS for scheduling uplink resources to at least one UE according to an exemplifying embodiment. The RBS comprises at least two receiving antenna branches and the RBS is operable in any cellular or wireless communication network employing multiple diversity at the RBS.

FIG. 1 illustrates the method 100 comprising receiving 110 transmissions from the at least one UE by means of the at least two receiving antenna branches; and determining 120 at least one parameter relating to signal quality of the received transmissions. The method further comprises determining 130 a diversity gain of the at least two receiving antenna branches, wherein the diversity gain is determined based on the determined parameter(s); and scheduling 140 uplink transmissions for the at least one UE based on the determined diversity gain.

An RBS may be serving a plurality of UEs and the RBS will receive uplink transmission from the UE and perform downlink transmission to the UEs. When the RBS receives an uplink transmission from a UE, or several UEs, the uplink transmission(s) is/are received by means of the receiving antenna branches. By an antenna branch is meant an antenna connected to the RBS by means of a wire. In other words, the antenna branches each comprise a wire and an antenna, or antenna element. Along the wire, one or more filters may be arranged. In case the wires are identical and the antennas are identical and they are both placed closely to each other and aimed, or pointing, in the same direction, it may be assumed that the energy of an uplink transmission received by the antennas, and transported to the RBS via the wires will be close to identical for every antenna branch. In such a scenario, the multiple receiving antenna branches will result in a diversity gain which is equal to the number of antenna branches. In other words, the antenna branches can be said to be close to perfectly balanced in such a situation.

However, the wires may not be identical, the antenna elements may not be identical, one branch may have a filter arranged along the wire whereas another branch has not, the wires may be of different length, the antennas, or antenna elements, may not be pointing in the same direction or may not be aiming in the same direction. All these different factors may negatively affect the diversity gain, which in turn negatively affects the ability, or capability, of the RBS to receive uplink transmissions. In other words, the antenna branches are not balanced.

The RBS receives 110 transmissions from the at least one UE by means of the at least two receiving antenna branches. The RBS "wants to" the determine diversity gain of the antenna branches and in order to do so, the RBS first determines 120 at least one parameter relating to signal quality of the received transmissions. There may be several parameters that relate to signal quality which may be used in order to determine the diversity gain, which will be described in more detail below.

Once the RBS has determined at least one parameter relating to signal quality of the received transmissions, the RBS determines 130 the diversity gain of the at least two receiving antenna branches using the determined at least one parameter. Once the diversity gain of the at least two antenna branches is determined, the RBS has obtained, or derived, knowledge of the physical conditions of the antenna branches which affects the ability, or capability, of the RBS to receive uplink transmissions. It shall be pointed out that there may be many more factors that affect the ability, or capability, of the RBS to receive uplink transmissions, for example radio conditions, number of UEs simultaneously transmitting in uplink and so on.

The RBS then schedules 140 uplink transmissions for the at least one UE based on the determined diversity gain. Since the diversity gain affects the ability, or capability, of the RBS to receive uplink transmissions, the RBS takes the diversity into account when scheduling uplink transmissions for the at least one UE. Also here, it shall be pointed out that even though the RBS schedules 140 uplink transmissions for the at least one UE based on the determined diversity gain, there may be several other factors that are considered by the RBS when scheduling uplink transmissions for the at least one UE.

The method performed by the RBS may have several advantages. The scheduling of uplink transmissions for the at least one UE still work properly even if the antenna branches are not balanced. The Enhanced UpLink, EUL, scheduling load estimation may be more accurate when the antenna branches are not balanced. Further, uplink resources may be more efficiently used without impacting Guaranteed Bit Rate (GBR) services. Yet an advantage may be that the RBS user need not worry about setting the diversity gain as it will be set automatically by the RBS.

According to an embodiment, the scheduling of uplink resources is dependent on the diversity gain such that the higher the diversity gain, the larger the amount of uplink transmissions is scheduled.

In a good or adequate situation, the diversity gain value is close to the number of antenna branches, i.e. for two antenna branches the diversity gain is close to 2, for three antenna branches the diversity gain is close to 3 and so on. However, in case the antenna branches are not balanced, the ability, or capability, of the RBS to receive uplink transmissions, is negatively affected, which means that a relatively high diversity gain results in that a relatively large amount of uplink transmissions is scheduled as compared to that a relatively low diversity gain results in that a relatively small amount of uplink transmissions is scheduled.

According to an embodiment, the at least one parameter relating to signal quality of the received transmissions is Received Signal Strength Indicator, RSSI.

As stated above, there are many different parameters that may be used for determining the diversity gain of the at least two receiving antenna branches. Different Radio Access Technologies, RATs, employ different parameters that may be used to represent a signal quality of a received uplink transmission.

One such parameter is the RSSI. The RBS receives transmissions from the at least one UE by means of the at least two receiving antenna branches; and determines to use RSSI for determining the diversity gain of the at least two receiving antenna branches. Once the RBS has determined the diversity gain using RSSI, the RBS schedules uplink transmissions for the at least one UE based on the determined diversity gain.

According to still an embodiment, the radio communication network employs Code Division Multiple Access, CDMA, or Wideband CDMA, WCDMA, and the at least one parameter relating to signal quality of the received transmissions is Received Signal Code Power, RSCP, Signal to Interference Ratio, SIR, or Received Total Wideband Power, RTWP.

In CDMA or WCDMA, at least three different parameters relate to signal quality of received uplink transmissions, namely RSCP, SIR and RTWP. In case the radio communication network employs CDMA or WCDMA, the RBS receives transmissions from the at least one UE by means of the at least two receiving antenna branches. The RBS determines, per antenna branch, at least one parameter relating to signal quality of the received transmissions, i.e. the RBS determines to use at least one of the RSCP, SIR and RTWP in order to determine the diversity gain of the at least two receiving antenna branches. Once the RBS has determined the diversity gain using at least one of the RSCP, SIR and RTWP, the RBS schedules uplink transmissions for the at least one UE based on the determined diversity gain.

According to yet an embodiment, the radio communication network employs Long Term Evolution, LTE, and the at least one parameter relating to signal quality of the received transmissions is Reference Signal Received Power, RSRP.

In LTE, RSRP is an example of a parameter that relates to signal quality of received uplink transmissions. The RBS receives transmissions from the at least one UE by means of the at least two receiving antenna branches; and determines to use RSRP, per antenna branch, for determining the diversity gain of the at least two receiving antenna branches. Once the RBS has determined the diversity gain using RSRP, the RBS schedules uplink transmissions for the at least one UE based on the determined diversity gain.

According to an embodiment, the radio communication network employs Time Division Multiple Access, TDMA, and the at least one parameter relating to signal quality of the received transmissions is Received Signal Level, RxLev.

In a TDMA based communication system, RxLev is an example of a parameter that relates to signal quality of received uplink transmissions. The RBS receives transmissions from the at least one UE by means of the at least two receiving antenna branches; and determines to use RxLev, per antenna branch, for determining the diversity gain of the at least two receiving antenna branches. Once the RBS has determined the diversity gain using RxLev, the RBS schedules uplink transmissions for the at least one UE based on the determined diversity gain.

According to an embodiment, wherein the method comprises determining more than one parameter relating to signal quality of the received transmissions, wherein the diversity gain of the at least two receiving antenna branches is based on the determined parameters.

The RBS may use more than one parameter relating to signal quality of the received transmissions in order to determine the diversity gain of the at least two receiving antenna branches. As can be seen above, some parameters indicate a power of the received signal and some parameters indicate an interference suffered by the received uplink transmissions. Both categories relate to a signal quality of the received uplink transmissions. In case the RBS uses more than one parameter to determine the diversity gain, the RBS may use only signal power based parameters, only and interference power based parameters, or a combination thereof.

According to still an embodiment, the RBS comprises N receiving antenna branches, x0, x1, x2, ..., xN−1, wherein x0 is the antenna branch having the strongest signal quality, wherein the diversity gain with regards to one of the parameters is determined as $$DivGain = 1 + 10^{-\left(\frac{\Delta 1}{10}\right)} + 10^{-\left(\frac{\Delta 2}{10}\right)} + \ldots + 10^{-\left(\frac{\Delta N-1}{10}\right)},$$

where Δ1=signal quality from x0-signal quality from branch x1, Δ2=signal quality from x0-signal quality from branch x2, ..., ΔN−1=signal quality from x0-signal quality from branch xN−1, and where the signal quality is determined based on the determined parameter(s).

As described above, the more antenna branches the RBS has, or are connected to the RBS, the higher the diversity gain. In the equation above, it is illustrated that each antenna branch provides an addition to the diversity gain. It can also be seen from the equation above that in case the difference in signal quality in dB between branch x0 and a branch xx, xx being any of branches x1, x2, ..., xN−1, is minimal, i.e. Δxx is close to 0, then $$\frac{\Delta xx}{10}$$

is close to 0. If $$\frac{\Delta xx}{10}$$

is close to 0, then $$10^{-\left(\frac{\Delta xx}{10}\right)}$$

is close to 1. This in turn results in that the diversity gain from antenna branch xx is close to 1. In case all N antenna branches are balanced, then the diversity gain is close to N. It can also be seen that the diversity gain can never be less than 1, hence the diversity gain lies in the interval of 1≤DivGain≤N, where N is the number of antenna branches. It shall be pointed out that the signal quality is measured in dB.

According to yet an embodiment, the RBS comprises two receiving antenna branches, wherein the diversity gain with regards to one of the parameters is determined as $$DivGain = 1 + 10^{-abs\left(\frac{diff}{10}\right)},$$

where "diff" is the difference between the RSSI, RSCP, RSRP, SIR, RTWP or RxLev respectively of the two receiving antenna branches.

In this embodiment, the diversity gain lies in the interval of 1≤DivGain≤2 with regards to one of the parameters. As described above, depending on the technology of the RAN, different parameters may be used in order to determine the diversity gain, or the DivGain.

According to still an embodiment, the transmissions from the at least one UE are received during a predetermined time period, which is between 1 millisecond and several hours.

The uplink transmissions from the at least one UE may be received during a predetermined time. After this predetermined time has lapsed, or expired, the RBS determines the diversity gain using at least one parameter relating to signal quality of the received transmissions. The predetermined time period may last only a millisecond or several hours. By receiving uplink transmissions from the at least one UE during a predetermined time period, a sliding average of the diversity gain is obtained.

The update rate could be rather fast but the influence of the Δ-value may be optionally divided by a larger number than 10 as is in the equations above. An example is that the predetermined time period lasts a few minutes but the Δ-value is divided by 100 instead of 10. Once the predetermined time period has lapsed, the diversity gain is determined, or updated if compared to a previous value. Another example is updating the diversity gain every 1-10 ms, i.e. the predetermined time period is 1-10 ms, wherein the diversity gain is determined, or updated, every time the predetermined time period lapses.

An example comprises using an offset parameter, e.g. during a testing period. By using the offset parameter, an offset of the diversity gain may be obtained.

In an example, both signal power based and interference power based parameters are used, i.e. RSCP and RSSI. If it is further assumed that the RBS has two antenna branches A and B. In this example, the diversity gain may then be determined as follows:

$$DivGain = \frac{(10^{diff_{RSCP}/10} + 10^{(diff_{RSSI}/10)}) * (1 + 10^{(diff_{RSSI}/10)})}{(1 + 10^{(diff_{RSCP}/10)}) * 10^{(diff_{RSSI}/10)}}$$

Note that the diversity gain could be larger than 2 even though the RBS has, or is connected to, two antenna branches. Such a scenario may occur if e.g. antenna branch A experiences higher interference than antenna branch B, but antenna branch B has higher RSCP than antenna branch A. In such a scenario, the SINR will be very beneficial in branch B, which benefits from both higher signal power and lower interference. Correspondingly, the effective diversity gain becomes larger than 2, which further illustrates the benefit from a signal aspect. The interference is likely to be imbalanced in the two antenna branches if the interference is only from a few high data rate UEs.

Embodiments herein also relate to an RBS operable in a radio communication network, adapted for scheduling uplink resources to at least one UE, wherein the RBS comprising at least two receiving antenna branches.

Exemplifying embodiments of such an RBS will now be described with reference to FIG. 2a. The RBS has the same technical features, objects and advantages as the method performed by the RBS described above. The RBS will only be described in brief in order to avoid unnecessary repetition.

Figure 2A:
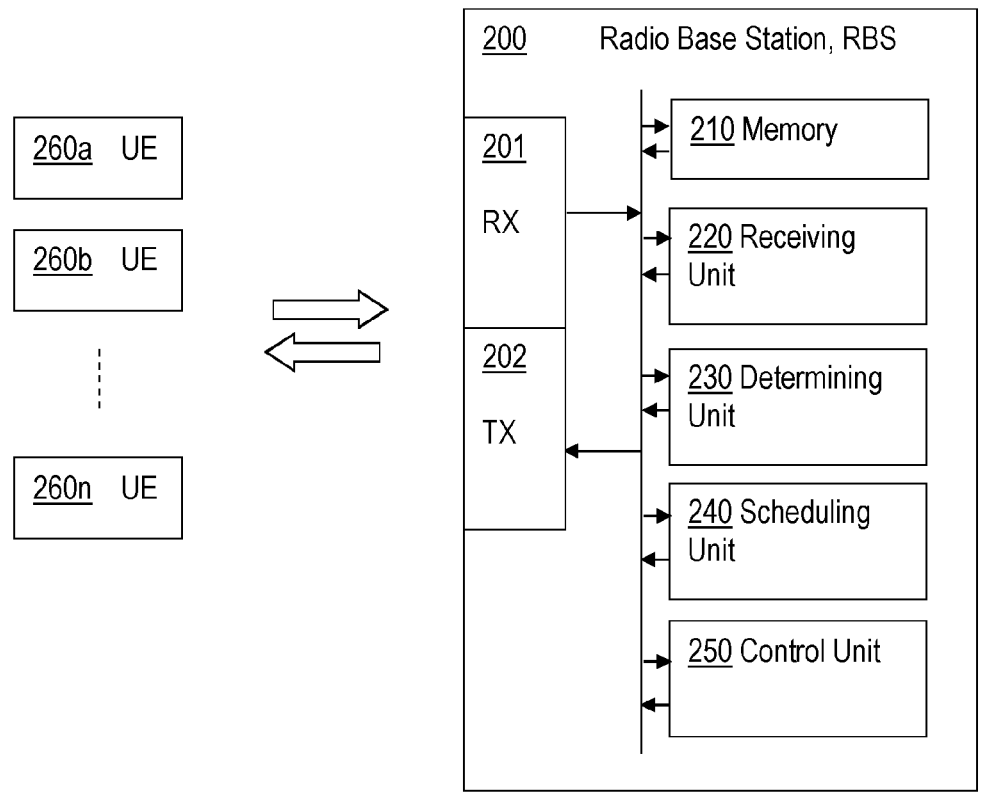
FIG. 2a is a block diagram of an RBS adapted for scheduling uplink resources to at least one UE according to an exemplifying embodiment.

FIG. 2a illustrates the RBS 200 comprising a receiving unit 220 adapted for receiving transmissions from the at least one UE by means of the at least two receiving antenna branches. The RBS further comprises a determining unit 230 adapted for determining at least one parameter relating to signal quality of the received transmissions, and adapted for determining a diversity gain of the at least two receiving antenna branches, wherein the diversity gain is determined based on the determined parameter(s). The RBS 200 also comprises a scheduling unit 240 adapted for scheduling uplink transmissions for the at least one UE based on the determined diversity gain.

The RBS may have several advantages. The scheduling of uplink transmissions for the at least one UE may still work properly even if the antenna branches are not balanced. The Enhanced UpLink, EUL, scheduling load estimation may be more accurate when the antenna branches are not balanced. Further, uplink resources may be more efficiently used without impacting GBR services. Yet an advantage may be that the RBS user need not worry about setting the diversity gain as it will be set automatically by the RBS.

According to an embodiment, the scheduling unit 240 is adapted to schedule uplink resources dependent on the diversity gain such that the higher the diversity gain, the larger the amount of uplink transmissions are scheduled.

According to still an embodiment, the at least one parameter relating to signal quality of the received transmissions is RSSI.

According to yet an embodiment, the radio communication network employs CDMA, or WCDMA, and the at least one parameter relating to signal quality of the received transmissions is RSCP, SIR, or RTWP.

According to another embodiment, the radio communication network employs LTE and the at least one parameter relating to signal quality of the received transmissions is RSRP.

According to yet another embodiment, the radio communication network employs TDMA and the at least one parameter relating to signal quality of the received transmissions is RxLev.

According to an embodiment, the determining unit 230 is adapted to determine more than one parameter relating to signal quality of the received transmissions, and adapted to determine the diversity gain of the at least two receiving antenna branches based on the determined parameters.

According to still an embodiment, the RBS comprises N receiving antenna branches, x0, x1, x2, ..., xN−1, wherein x0 is the antenna branch having the strongest signal quality, wherein the diversity gain with regards to one of the parameters is determined as $$DivGain = 1 + 10^{-\left(\frac{\Delta 1}{10}\right)} + 10^{-\left(\frac{\Delta 2}{10}\right)} + \ldots + 10^{-\left(\frac{\Delta N-1}{10}\right)},$$

where Δ1=signal quality from x0-signal quality from branch x1, Δ2=signal quality from x0-signal quality from branch x2, ..., ΔN−1=signal quality from x0-signal quality from branch xN−1, and where the signal quality is determined based on the determined parameter(s).

According to yet another embodiment, the RBS comprises two receiving antenna branches, wherein the determining unit 230 is adapted to determine the diversity gain with regards to one of the parameters as $$DivGain = 1 + 10^{-abs\left(\frac{diff}{10}\right)},$$

where "cliff" is the difference between the RSSI, RSCP, RSRP, SIR, RTWP or RxLev respectively of the two receiving antenna branches.

According to still an embodiment, the transmissions from the at least one UE are received during a predetermined time period, which is between 1 millisecond and several hours.

Figure 2B:
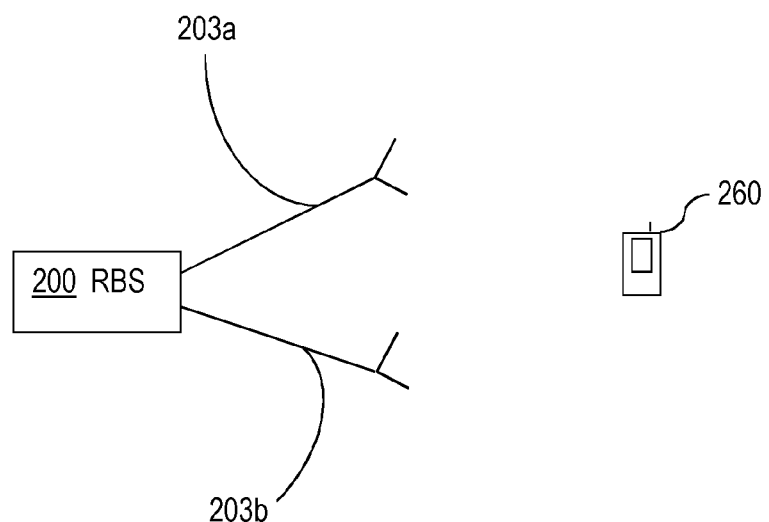
FIG. 2b is a schematic illustration of an RBS comprising two antenna branches.

FIG. 2b is a schematic illustration of an RBS comprising two antenna branches. An RBS may also have its coverage area divided into sectors, wherein each sector may comprise two or more antenna branches.

FIG. 2b illustrates the RBS 200 having two antenna branches 203a and 203b. The RBS 200 is receiving uplink transmissions from a UE 260. In a balanced scenario, the antenna branches 203a and 203b comprising a respective antenna, or antenna element, and a respective wire, or feeder cable, experience similar signal energy and similar interference energy associated with received transmissions from the UE 260. However, one of the wires or feeder cables of the antenna branches may suffer from different attenuation e.g. due to being of different lengths, or the presence of a filter in only one wire or feeder cable. Then the uplink transmissions from the UE 260 will be received by the RBS 200 by means of the antenna branches where the two antenna branches 203a and 203b do not experience similar signal energy and/or interference energy. This may result in the RBS not being able to receive as much uplink transmissions compared to when the antenna branches are balanced. In case the RBS remains oblivious of the imbalance, the RBS may schedule more uplink transmissions than the RBS is able to receive. By determining the diversity gain, the RBS 200 is enabled to schedule less uplink transmissions from the at least one UE 260 in case the diversity gain indicates that the antenna branches are imbalanced.

In FIG. 2a, the RBS 200 is also illustrated comprising a receiving unit 201 and a transmitting unit 202. Through these two units, the RBS 200 is adapted to communicate with other nodes and/or entities in the wireless communication network. The receiving unit 201 may comprise more than one receiving arrangement. For example, the receiving unit may be connected to both a wire and an antenna, by means of which the RBS 200 is enabled to communicate with other nodes and/or entities in the wireless communication network. Similarly, the transmitting unit 202 may comprise more than one transmitting arrangement, which in turn are connected to both a wire and an antenna, by means of which the RBS 200 is enabled to communicate with other nodes and/or entities in the wireless communication network. The RBS 200 further comprises a memory 210 for storing data. Further, the RBS 200 is illustrated comprising a control or processing unit 250 which in turns is connected to the different units 210-240 or the processing unit or control unit 250 may include units 210-240. It shall be pointed out that this is merely an illustrative example and the RBS 200 may comprise more, less or other units or modules which execute the functions of the RBS 200 in the same manner as the units illustrated in FIG. 2a.

It should be noted that FIG. 2a merely illustrates various functional units in the RBS 200 in a logical sense. The functions in practice may be implemented using any suitable software and hardware means/circuits etc. Thus, the embodiments are generally not limited to the shown structures of the RBS 200 and the functional units. Hence, the previously described exemplary embodiments may be realised in many ways. For example, one embodiment includes a computer-readable medium having instructions stored thereon that are executable by the control or processing unit 250 for executing the method steps in the RBS 200. The processing unit 250 may comprises units 210-240 and hence perform the functions of these units as preciously described. The instructions executable by the computing system and stored on the computer-readable medium perform the method steps of the RBS 200 as set forth in the claims.

Figure 3:
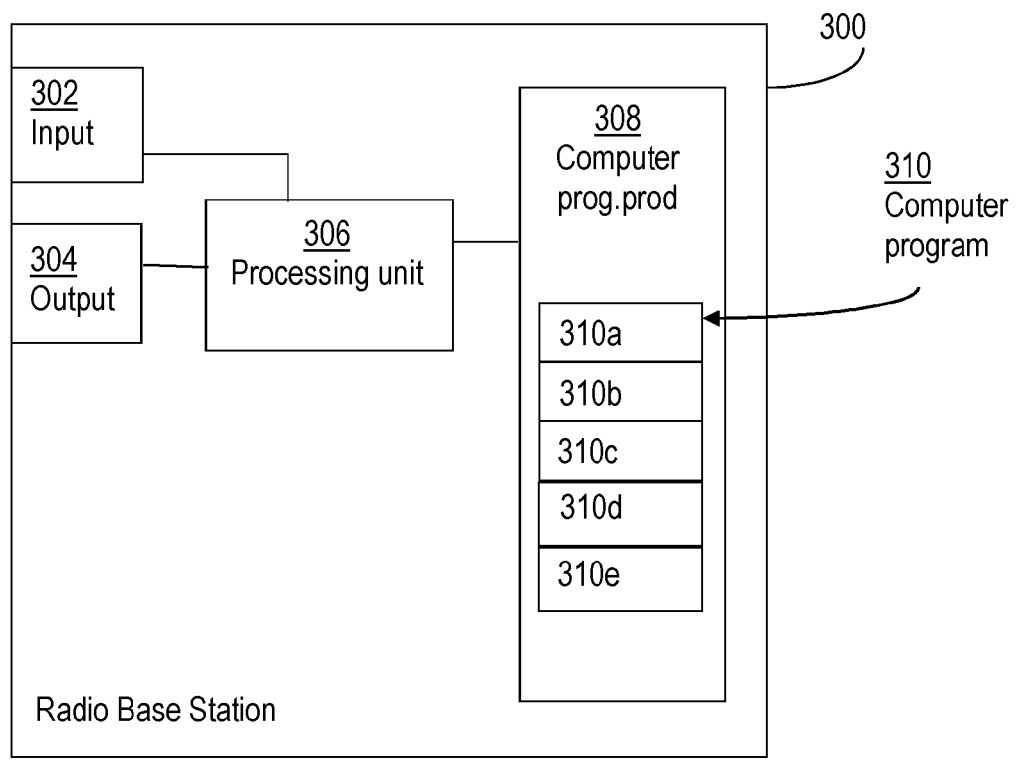
FIG. 3 is a schematic view illustrating an RBS for scheduling uplink resources to at least one UE according to an exemplifying embodiment.

FIG. 3 schematically shows an embodiment of a RBS 300. Comprised in the RBS 300 are here a processing unit 306, e.g. with a DSP (Digital Signal Processor). The processing unit 306 may be a single unit or a plurality of units to perform different actions of procedures described herein. The RBS 300 may also comprise an input unit 302 for receiving signals from other entities, and an output unit 304 for providing signal(s) to other entities. The input unit and the output unit may be arranged as an integrated entity or as illustrated in the example of FIG. 2a, as one or more interfaces 201/202.

Furthermore, the RBS 300 comprises at least one computer program product 308 in the form of a non-volatile memory, e.g. an EEPROM (Electrically Erasable Programmable Read-Only Memory), a flash memory and a hard drive. The computer program product 308 comprises a computer program 310, which comprises code means, which when executed in the processing unit 306 in the RBS 300 causes the RBS 300 to perform the actions e.g. of the procedure described earlier in conjunction with FIG. 1.

The computer program 310 may be configured as a computer program code structured in computer program modules 310a-310e. Hence, in an exemplifying embodiment, the code means in the computer program of the RBS 300 comprises a receiving unit, or module, for receiving transmissions from the at least one UE by means of the at least two receiving antenna branches. The computer program further comprises a determining unit, or module, for determining at least one parameter relating to signal quality of the received transmissions, and for determining a diversity gain of the at least two receiving antenna branches, wherein the diversity gain is determined based on the determined parameter(s). The computer program further comprises a scheduling unit, or module, for scheduling uplink transmissions for the at least one UE based on the determined diversity gain.

The computer program modules could essentially perform the actions of the flow illustrated in FIG. 1, to emulate the RBS 300. In other words, when the different computer program modules are executed in the processing unit 306, they may correspond to the units 220-240 of FIG. 2a.

Although the code means in the embodiment disclosed above in conjunction with FIG. 2a is implemented as computer program modules which when executed in the respective processing unit causes the RBS to perform the actions described above in the conjunction with FIG. 1 mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the RBS.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by a Radio Base Station, RBS, for a radio communication network, for scheduling uplink resources to at least one User Equipment, UE, the RBS comprising at least two receiving antenna branches, the method comprising:
   receiving transmissions from the at least one UE using the at least two receiving antenna branches;
   determining at least one parameter relating to signal quality of the received transmissions;
   determining a diversity gain of the at least two receiving antenna branches, the diversity gain being an exponential function of the determined at least one parameter; and
   scheduling uplink transmissions for the at least one UE based on the determined diversity gain.

2. The method of claim 1, wherein the scheduling of uplink resources is dependent on the diversity gain such that the higher the diversity gain, the larger the amount of uplink transmissions are scheduled.

3. The method of claim 1, wherein the at least one parameter relating to signal quality of the received transmissions is Received Signal Strength Indicator, RSSI.

4. The method of claim 1, wherein the radio communication network employs one of Code Division Multiple Access, CDMA, and Wideband CDMA, WCDMA, and the at least one parameter relating to signal quality of the received transmissions is one of Received Signal Code Power, RSCP, Signal to Interference Ratio, SIR, and Received Total Wideband Power, RTWP.

5. The method of claim 1, wherein the radio communication network employs Long Term Evolution, LTE, and the at least one parameter relating to signal quality of the received transmissions is Reference Signal Received Power, RSRP.

6. The method of claim 1, wherein the radio communication network employs Time Division Multiple Access, TDMA, and the at least one parameter relating to signal quality of the received transmissions is Received Signal Level, RxLev.

7. The method of claim 1, wherein the method comprises determining more than one parameter relating to signal quality of the received transmissions, wherein the diversity gain of the at least two receiving antenna branches is based on the determined parameters.

8. The method of claim 7, wherein the RBS comprises N receiving antenna branches, x0, x1, . . . , xN−1, wherein x0 is the antenna branch having the strongest signal quality, wherein the diversity gain with regards to one of the parameters is determined as $$DivGain = 1 + 10^{-\left(\frac{\Delta 1}{10}\right)} + 10^{-\left(\frac{\Delta 2}{10}\right)} + \ldots + 10^{-\left(\frac{\Delta N-1}{10}\right)},$$

where
  Δ1=signal quality from x0-signal quality from branch x1,
  Δ2=signal quality from x0-signal quality from branch x2, . . . ,
  ΔN−1=signal quality from x0-signal quality from branch xN−1,
  where the signal quality is determined based on the determined parameter(s).

9. The method of claim 1, wherein the RBS comprises two receiving antenna branches, wherein the diversity gain with regards to one of the parameters is determined as $$DivGain = 1 + 10^{-abs\left(\frac{diff}{10}\right)},$$

where "diff" is the difference between the RSSI, RSCP, RSRP, SIR, RTWP or RxLev respectively of the two receiving antenna branches.

10. The method of claim 1, wherein the transmissions from the at least one UE are received during a predetermined time period, which is between 1 millisecond and several hours.

11. A Radio Base Station, RBS, configured for a radio communication network and for scheduling uplink resources to at least one User Equipment, UE, the RBS comprising at least two receiving antenna branches, the RBS comprising:
  a receiving unit configured to receive transmissions from the at least one UE using the at least two receiving antenna branches;
  a determining unit configured to determine at least one parameter relating to signal quality of the received transmissions, and configured to determine a diversity gain of the at least two receiving antenna branches, the diversity gain being an exponential function of the determined at least one parameter; and
  a scheduling unit configured to schedule uplink transmissions for the at least one UE based on the determined diversity gain.

12. An The RBS of claim 11, wherein the scheduling unit is further configured to schedule uplink resources dependent on the diversity gain such that the higher the diversity gain, the larger the amount of uplink transmissions are scheduled.

13. The RBS of claim 11, wherein the at least one parameter relating to signal quality of the received transmissions is Received Signal Strength Indicator, RSSI.

14. The RBS of claim 11, wherein the radio communication network employs one of Code Division Multiple Access, CDMA, and Wideband CDMA, WCDMA, and the at least one parameter relating to signal quality of the received transmissions is one of Received Signal Code Power, RSCP, Signal to Interference Ratio, SIR, and Received Total Wideband Power, RTWP.

15. The RBS of claim 11, wherein the radio communication network employs Long Term Evolution, LTE, and the at least one parameter relating to signal quality of the received transmissions is Reference Signal Received Power, RSRP.

16. The RBS of claim 11, wherein the radio communication network employs Time Division Multiple Access, TDMA, and the at least one parameter relating to signal quality of the received transmissions is Received Signal Level, RxLev.

17. The RBS of claim 11, wherein the determining unit further configured to determine more than one parameter relating to signal quality of the received transmissions, and further configured to determine the diversity gain of the at least two receiving antenna branches based on the determined parameters.

18. The RBS of claim 17, wherein the RBS comprises N receiving antenna branches, x0, x1, x2, . . . , xN−1, wherein x0 is the antenna branch having the strongest signal quality, wherein the determining unit is adapted to determine the diversity gain with regards to one of the parameters as $$DivGain = 1 + 10^{-\left(\frac{\Delta 1}{10}\right)} + 10^{-\left(\frac{\Delta 2}{10}\right)} + \ldots + 10^{-\left(\frac{\Delta N-1}{10}\right)},$$

where
  Δ1=signal quality from x0-signal quality from branch x1,
  Δ2=signal quality from x0-signal quality from branch x2, . . . ,
  ΔN−1=signal quality from x0-signal quality from branch xN−1,
  where the signal quality is determined based on the determined parameter(s).

19. The RBS of claim 11, wherein the RBS comprises two receiving antenna branches, wherein the determining unit is further configured to determine the diversity gain with regards to one of the parameters as $$DivGain = 1 + 10^{-abs\left(\frac{diff}{10}\right)},$$

where "diff" is the difference between the RSSI, RSCP, RSRP, SIR, RTWP or RxLev respectively of the two receiving antenna branches.

20. The RBS of claim 11, wherein the transmissions from the at least one UE are received during a predetermined time period, the predetermined time period being between 1 millisecond and a plurality of hours.

21. A program, comprising computer readable code, which when run by a processing unit of a Radio Base Station, RBS, for a radio communication network, for scheduling uplink resources to at least one User Equipment, UE, the RBS comprising at least two receiving antenna branches, causes the RBS to perform a method comprising:
  receiving transmissions from the at least one UE using the at least two receiving antenna branches;
  determining at least one parameter relating to signal quality of the received transmissions;
  determining a diversity gain of the at least two receiving antenna branches, the diversity gain being an exponential function of the determined at least one parameter; and
  scheduling uplink transmissions for the at least one UE based on the determined diversity gain.

* * * * *